(12) United States Patent
Manabe

(10) Patent No.: US 6,735,389 B2
(45) Date of Patent: May 11, 2004

(54) DATA SUPERIMPOSING DEVICE IN CAMERA

(75) Inventor: Mitsuo Manabe, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/620,449

(22) Filed: Jul. 17, 2003

(65) Prior Publication Data

US 2004/0062539 A1 Apr. 1, 2004

(30) Foreign Application Priority Data

Jul. 24, 2002 (JP) ........................................ 2002-215325

(51) Int. Cl.$^7$ .............................................. G03B 17/24
(52) U.S. Cl. ...................................................... 396/318
(58) Field of Search .................................. 396/315–318

(56) References Cited

U.S. PATENT DOCUMENTS 5,339,123 A * 8/1994 Soshi et al. .................. 396/318
5,617,162 A * 4/1997 Kato et al. ................... 396/318
5,678,084 A   10/1997 Hori ............................ 396/317
5,864,724 A *  1/1999 Ozaki et al. .................. 396/310
5,930,538 A *  7/1999 Ozaki et al. .................. 396/310

FOREIGN PATENT DOCUMENTS

JP      7-295061    11/1995   ........... G03B/17/24
JP    2000-352756   12/2000   ........... G03B/17/24

* cited by examiner

*Primary Examiner*—W. B. Perkey
(74) *Attorney, Agent, or Firm*—Young & Thompson

(57) ABSTRACT

In the data superimposing device, an aperture is provided in the narrowest position of the space formed between the arc-shaped outer wall surface of a take-up spool chamber and the outer wall surface of a photographic light path shielding cylinder, and an image-forming lens is installed immediately behind the aperture. It is thereby made possible to effectively suppress flare and clearly superimpose data on a film because the space, though it is limited in size, is expected before behind the aperture.

3 Claims, 6 Drawing Sheets

DATA SUPERIMPOSING DEVICE IN CAMERA

BACKGROUND OF THE INVENTION

1. Field of the Invention

The present invention relates to a data superimposing device in a camera that superimposes an image representing information such as the shooting date and time on a film.

2. Description of the Related Art

There are conventional data superimposing devices of this kind in which a plurality of light emitting elements arranged vertically are selectively caused to emit light in synchronism with the running of the film, and a data image representing photographic data including the shooting date and time is superimposed over the picture on the film by causing the luminous flux from these light emitting elements to form the data image on the film through an optical system.

In the conventional data superimposing device, a circuit board on which the light emitting elements are mounted is arranged in the vicinity of the aperture, and it is required to secure a space for arranging this circuit board in the vicinity of the aperture, entailing a problem that the dimensions, especially the lateral dimension, of the camera are inevitably enlarged.

In order to solve this problem, Japanese Patent Application Publication No. 7-295061 discloses that a data superimposing light path is formed between the film take-up spool chamber and the photographic light path of the camera, one end of the data superimposing light path is disposed to face the film, and the other end is arranged at the circuit board on which light emitting elements are mounted. In this data superimposing device, with a view to further space saving within the camera, the data superimposing light path is bent along the curved wall surface of the take-up spool chamber by refracting the luminous flux from the light emitting elements a plurality of times by using a mirror and a prism. However, the use of the mirror and the prism involves a disadvantage of increasing the number of components and complicating the structure.

Japanese Patent Application Publication No. 2000-352756 discloses that a data superimposing light path is formed between the take-up spool chamber and the photographic light path of the camera, and space saving within the camera is attempted by installing at an inclination to the film surface an image-forming lens for causing a luminous flux from light emitting elements to form a data image on the film surface. However, this technique entails a disadvantage of manufacturing difficulty because the image-forming lens should be held at an inclination.

Furthermore, the formation of a data superimposing light path in the limited space between the take-up spool chamber and the photographic light path as according to Japanese Patent Application Publication Nos. 7-295061 and 2000-352756 has another disadvantage that a flare may arise and blur the superimposed data image.

SUMMARY OF THE INVENTION

An object of the present invention, attempted in view of these circumstances, is to provide a data superimposing device for cameras which is compactly structured and allows clear superimposition of data.

In order to attain the above-described object, the present invention is directed to a data superimposing device in a camera for superimposing an image representing data on a film, comprising: a light emitting unit which has a plurality of light emitting points emitting a luminous flux in synchronism with a running of the film to superimpose the image on the film, the light emitting unit being arranged in a space formed between an outer wall surface of a photographic light path shielding cylinder and an arc-shaped outer wall surface of one of a film cartridge chamber and a film take-up spool chamber; an image-forming lens which is arranged in the space and causes the luminous flux to form the image on the film; and an aperture member which has an aperture through which the luminous flux travels to reach the film, the aperture being arranged at a narrowest position of the space.

According to the present invention, by providing the aperture in the narrowest position of the space formed between the outer wall surface of the photographic light path shielding cylinder and the arc-shaped outer wall surface of the cartridge chamber or the take-up spool chamber, the space, though limited in size, is expanded before and behind the aperture to make possible effective flare suppression and clear superimposition of the data on the film.

Preferably, the image-forming lens is arranged immediately behind the aperture. According to the present invention, by providing the image-forming lens, like the aperture, in the narrowest position of the space, the image-forming lens can be easily fitted without having to incline it.

The image-forming lens may be installed by being pressed in through a fitting hole bored in an inner wall of the one of the film cartridge chamber and the film take-up spool chamber from a side of the one of the film cartridge chamber and the film take-up spool chamber. According to the present invention, installation of the image-forming lens by pressing it in through the fitting hole bored in the wall surface of the cartridge chamber or the take-up spool chamber from the side of the cartridge chamber or the take-up spool chamber makes it possible to hold the image-forming lens accurately even if the wall of the cartridge chamber or the take-up spool chamber is thin.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A data superimposing device in a camera according to a preferred embodiment of the present invention will be described in detail below with reference to the accompanying drawings.

Figure 1:
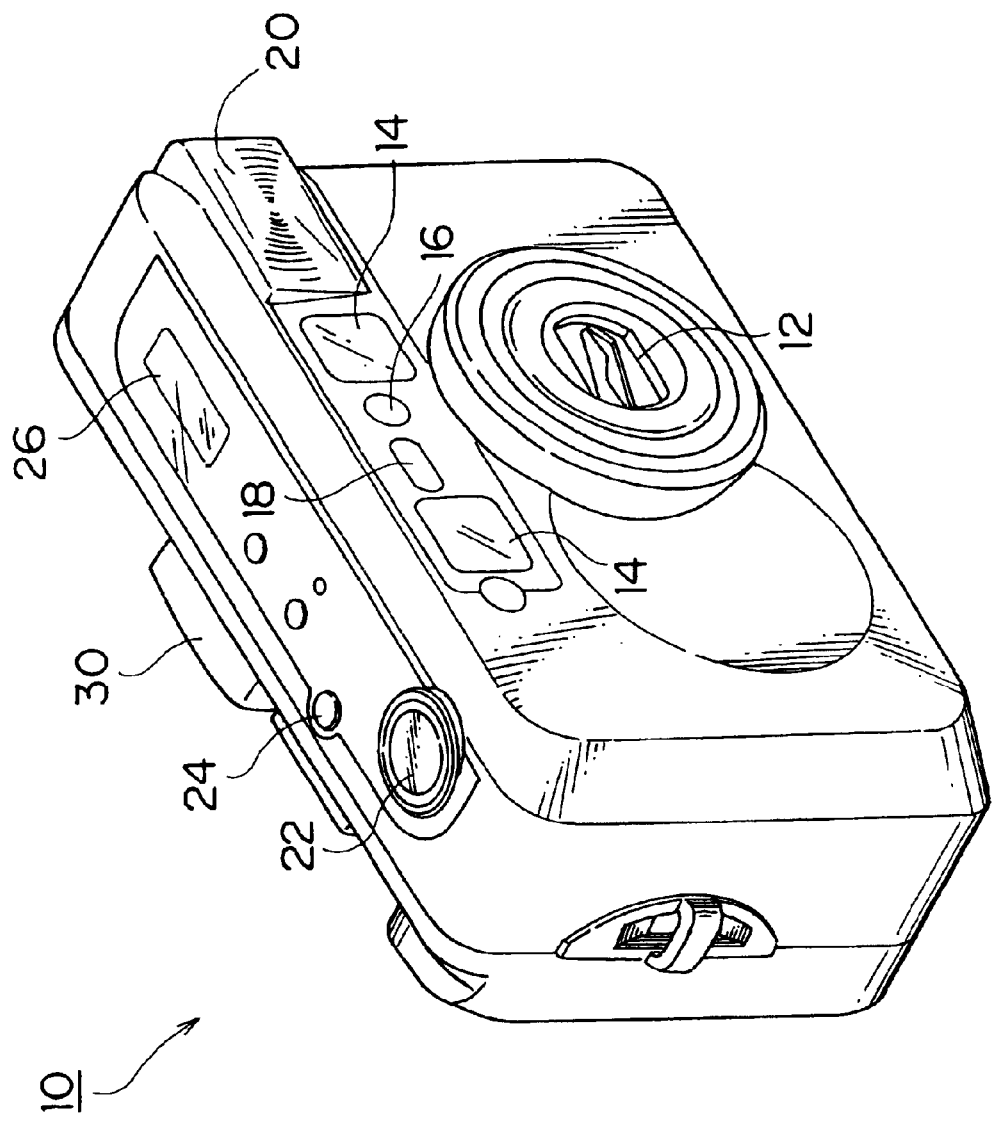
FIG. 1 shows a perspective front view of a camera.

FIG. 1 shows a perspective front view of a camera with a data superimposing device according to an embodiment of the present invention built into it. As shown in the drawing, a collapsible zoom lens 12 is provided in front of a camera 10 and substantially in the central position of the camera 10. Above the zoom lens 12 are provided AF windows 14 and 14, a photometric window 16, a view finder window 18 and an electric flash lamp 20. On the top face of the camera 10 are provided a shutter release button 22, a power switch button 24 and a liquid crystal panel 26.

Figure 2:
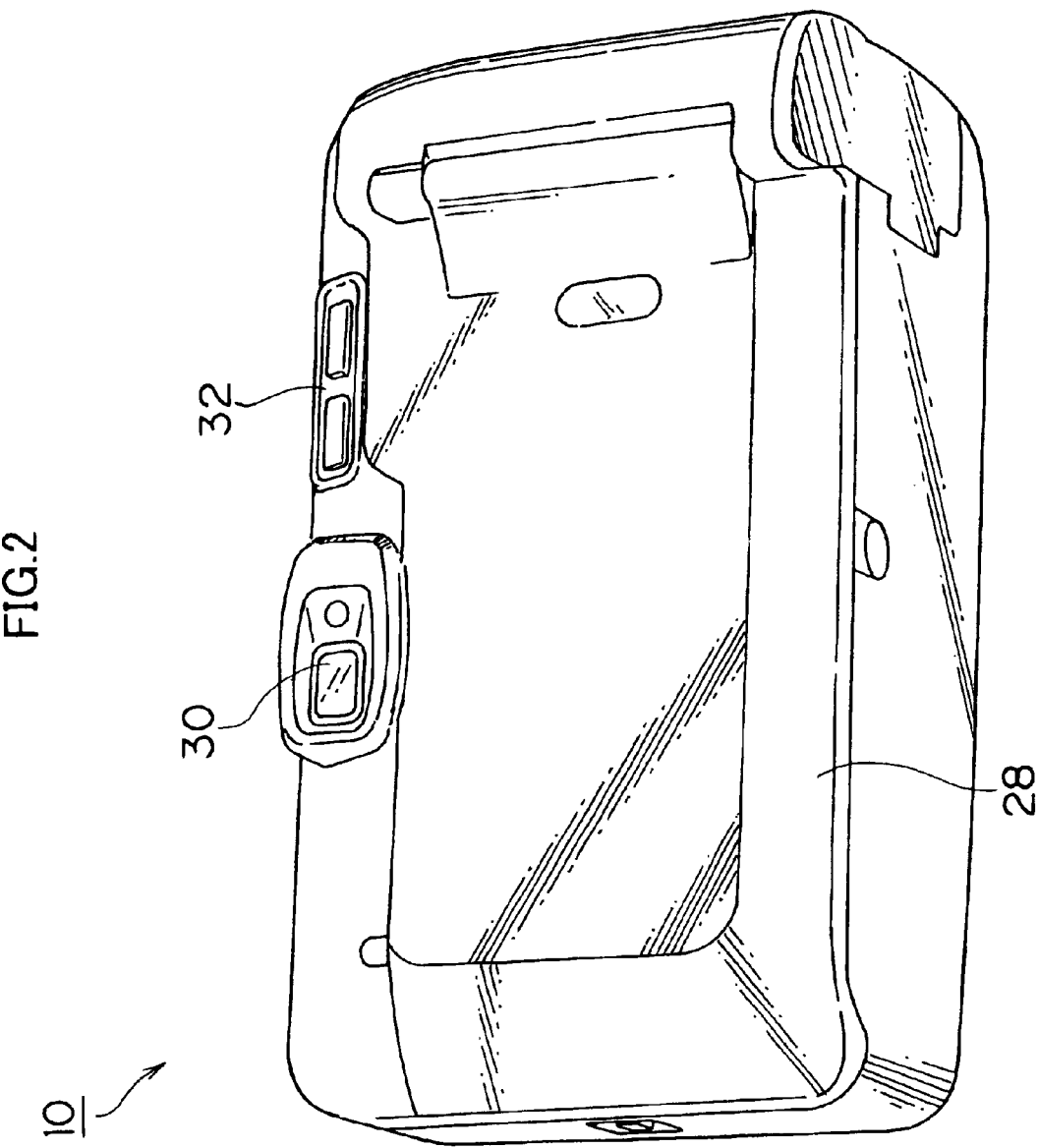
FIG. 2 shows a perspective rear view of the camera.

FIG. 2 shows a perspective rear view of the camera 10 shown in FIG. 1. On the rear face of the camera 10 is provided an openable rear lid 28, and a view finder eyepiece 30 and a zooming lever 32 are arranged above the rear lid 28.

Figure 3:
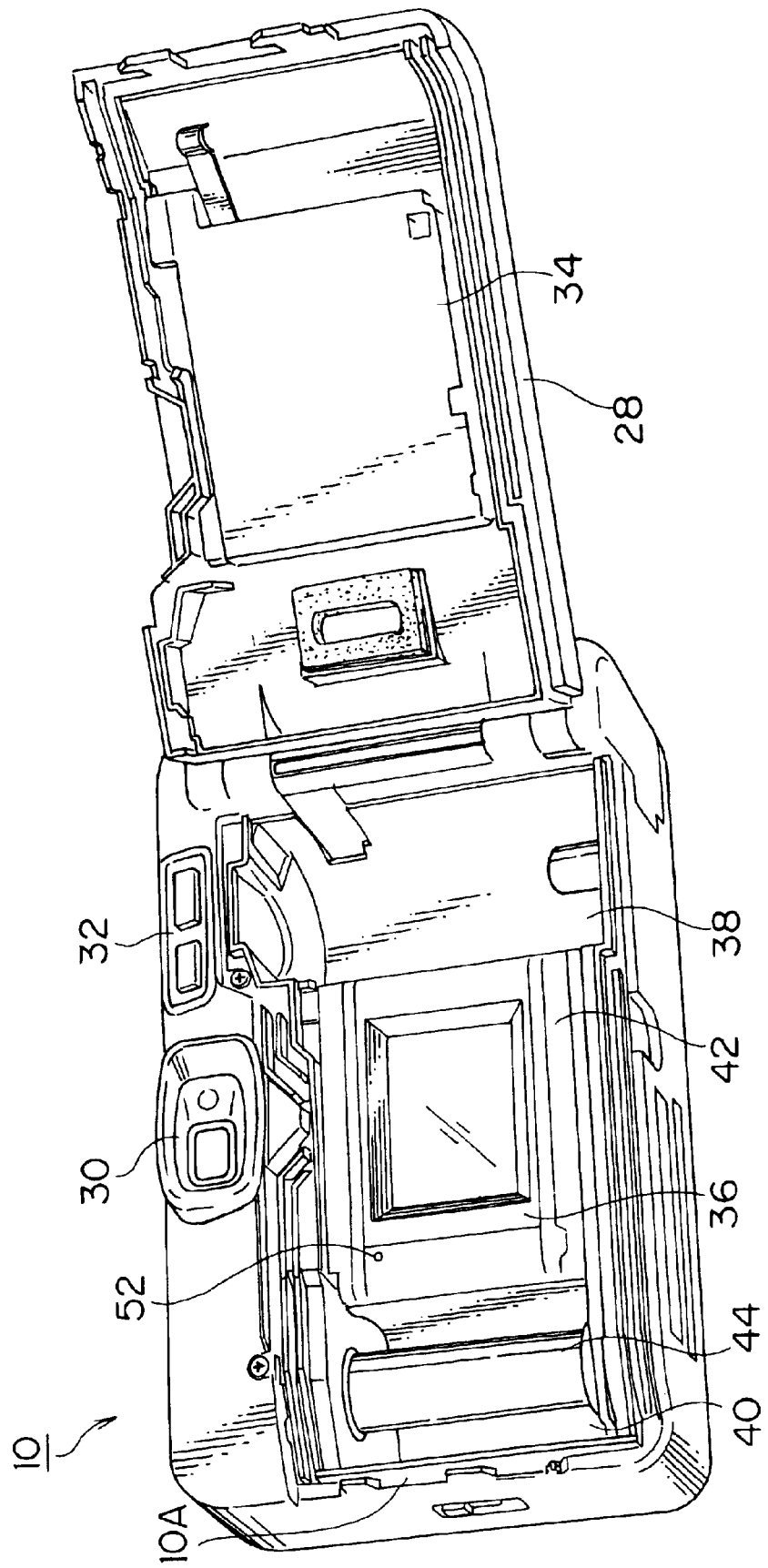
FIG. 3 shows a perspective rear view of the camera with its rear lid open.

FIG. 3 shows a perspective rear view of the camera 10 with the rear lid 28 open. As shown in the drawing, inside the rear lid 28 is provided a pressure plate 34. On a rear surface of a camera body 10A covered by the rear lid 28 is installed, substantially in the central position, a photographic light path shielding cylinder (fixed cylinder of the zoom lens) 36, on two sides of which are arranged a film cartridge chamber 38 and a film take-up spool chamber 40. The cartridge of the film is loaded into the cartridge chamber 38, and the film runs a film running path 42 formed between the cartridge chamber 38 and the take-up spool chamber 40, and is taken up by a spool 44 provided in the take-up spool chamber 40.

Figure 4:
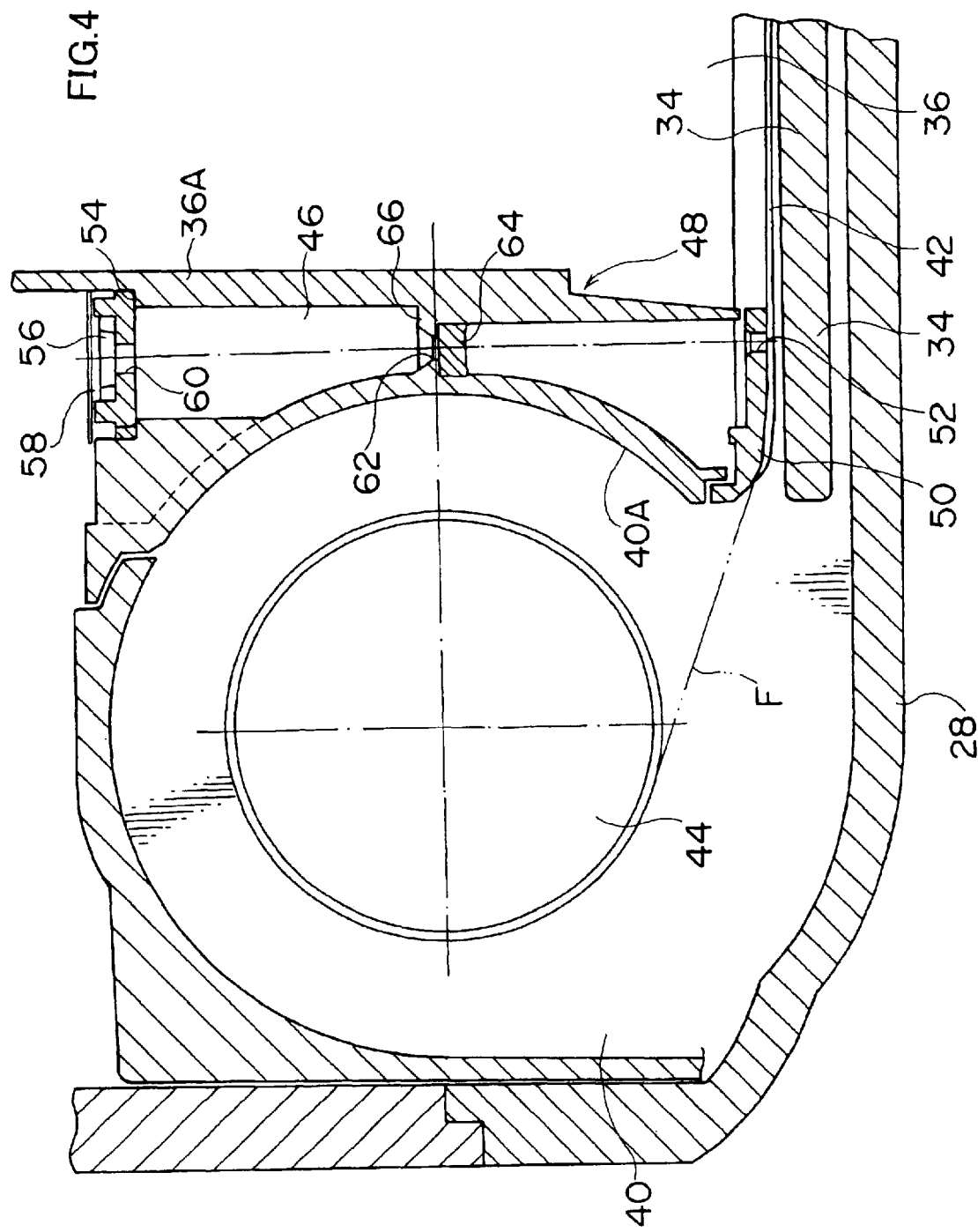
FIG. 4 shows a sectional view of the configuration of a data superimposing device, which is a first preferred embodiment of the present invention.

Between the photographic light path shielding cylinder 36 and the take-up spool chamber 40 is formed a space 46 as shown in FIG. 4. The space 46 is formed between an outer wall surface 36A, of which section is formed substantially linearly, of the photographic light path shielding cylinder 36 and an outer wall surface 40A, of which section is formed in an arc shape, of the take-up spool chamber 40. The space 46 has a shape of which width expands from the substantially longitudinal central position towards two ends. A data superimposing device 48 is installed in the space 46.

As shown in FIG. 4, one end of the space 46 facing the rear face of the camera 10 is covered by a camera body frame 50 constituting the film running path 42, and in part of the camera body frame 50 is formed a data superimposing window 52. The data superimposing window 52 is formed facing a film F running the film running path 42.

The other end of the space 46 facing the front face of the camera 10 is covered by a circuit board supporting plate 54. To the circuit board supporting plate 54 is fitted a circuit board 58, and a plurality of (for instance seven) light emitting diodes (LEDs) 56 are mounted on the circuit board 58. The LEDs 56 are arranged in a row in a direction orthogonal to the running direction of the film F, and emit a luminous flux to generate data image to be superimposed on the film F. The luminous flux emitted from the LEDs 56 travels in the space 46 through a slit 60 cut in the circuit board supporting plate 54, and reaches the film F through an aperture 62 and an image-forming lens 64 arranged within the space 46, and the data superimposing window 52. The timing of turning on and off the LEDs 56 is controlled by a control device (not shown), which turns on the LEDs 56 in synchronism with the running of the film F at timings matching the data image representing the photographic data, including the shooting date and time, to be recorded on the film F.

As shown in FIG. 4, the aperture 62 installed in the space 46 is arranged at the narrowest position of the space 46, namely in the position where the outer wall surface 36A of the photographic light path shielding cylinder 36 and the outer wall surface 40A of the take-up spool chamber 40 come closest to each other (substantially the longitudinal central position of the space 46). The aperture 62 is formed as a hole with a predetermined diameter in a partitioning wall 66 dividing the space 46 into front and rear parts, and the image-forming lens 64 is arranged immediately behind the aperture 62. The image-forming lens 64 is inserted from the end of the space 46 on the rear side of the camera 10, and pressed in between the outer wall surface 36A of the photographic light path shielding cylinder 36 and the outer wall surface 40A of the take-up spool chamber 40 to be installed there.

The data superimposing device embodying the invention in this mode, configured as described above, operates in the following manner.

When a frame has been shot and the winding of the film F is started, the control device turns on the LEDs 56 in synchronism with the running of the film F at appropriate timings. The luminous flux emitted from the LEDs 56 travels in the space 46 through the slit 60 cut in the circuit board supporting plate 54, reaches the film F through the aperture 62 and the image-forming lens 64 arranged in the space 46 and the data superimposing window 52, and forms the data image on the film F. As a result, the photographic data are superimposed on the film F.

Here in the data superimposing device 48 according to the embodiment of the present invention, the arc-shaped wall surface of the take-up spool chamber 40 is utilized to install the aperture 62 in the narrowest position of the space 46 with the result that the space 46, though limited in size, is expanded before and behind the aperture 62 to make possible effective flare suppression and clear superimposition of data on the film F free from blurring.

Moreover, as there is no need to hold the image-forming lens 64 at an inclination or to install a mirror and the like, the structure is simplified and the manufacturing is facilitated.

Figure 5:
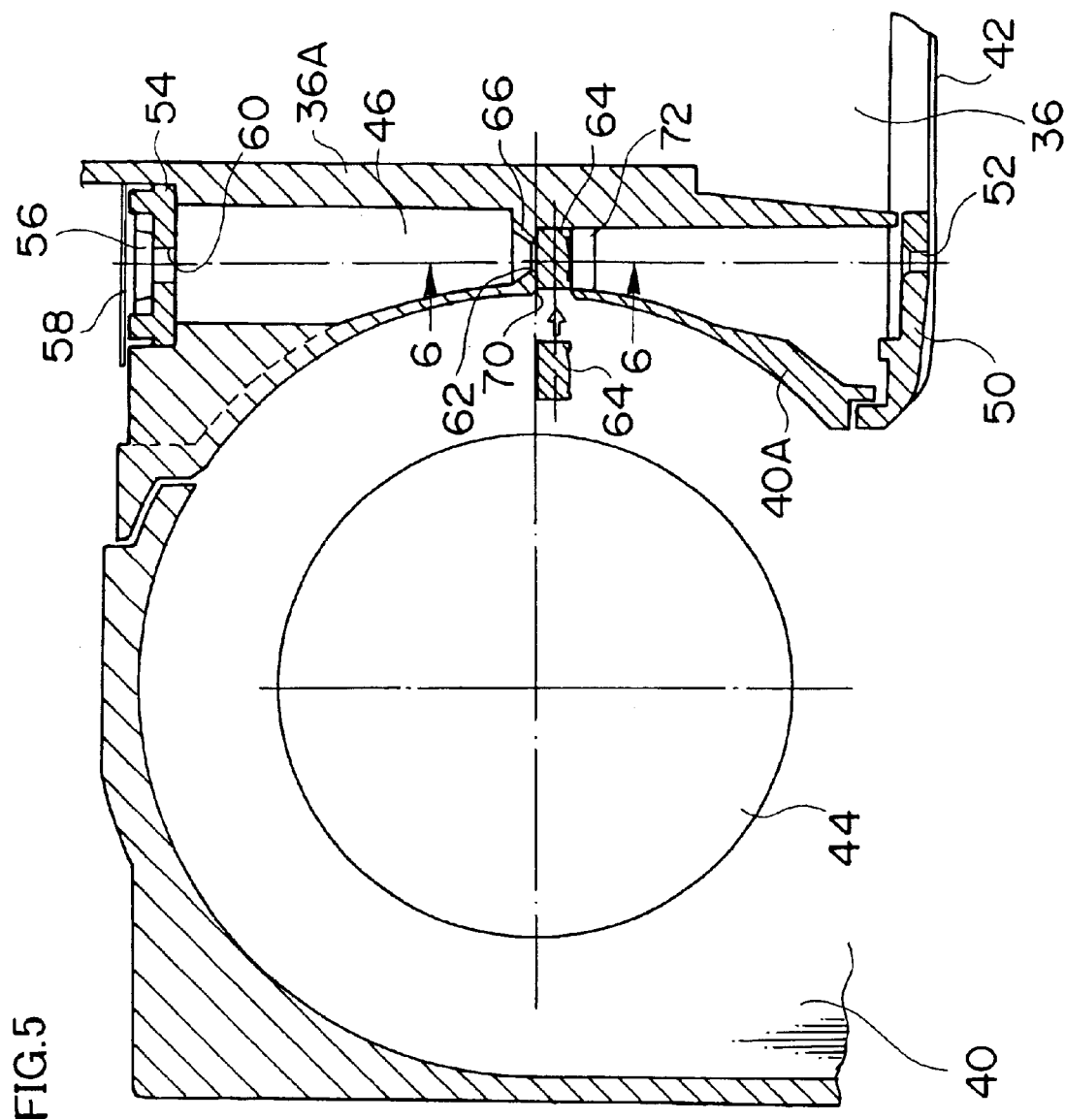
FIG. 5 shows a sectional view of the configuration of another data superimposing device, which is a second preferred embodiment of the invention.

FIG. 5 shows the configuration of essential parts of another data superimposing device according to a second embodiment of the present invention. The same or similar members to those in the first embodiment are designated by respectively the same reference signs.

In the first embodiment, the image-forming lens 64 is inserted from the end of the space 46 on the rear side of the camera 10, and pressed in between the outer wall surface 36A of the photographic light path shielding cylinder 36 and the outer wall surface 40A of the take-up spool chamber 40 to be installed there. However, if the take-up spool chamber 40 is arranged even closer to the center of the camera 10 for a further size reduction, the wall thickness of the take-up spool chamber 40 becomes thinner as shown in FIG. 5, and it is impossible to hold the image-forming lens 64 accurately.

In view of this problem, in the second embodiment, a fitting hole 70 for the image-forming lens 64 is bored in the inner wall surface of the take-up spool chamber 40, and the image-forming lens 64 is installed by pressing it into this fitting hole 70 from the take-up spool chamber side.

Figure 6:
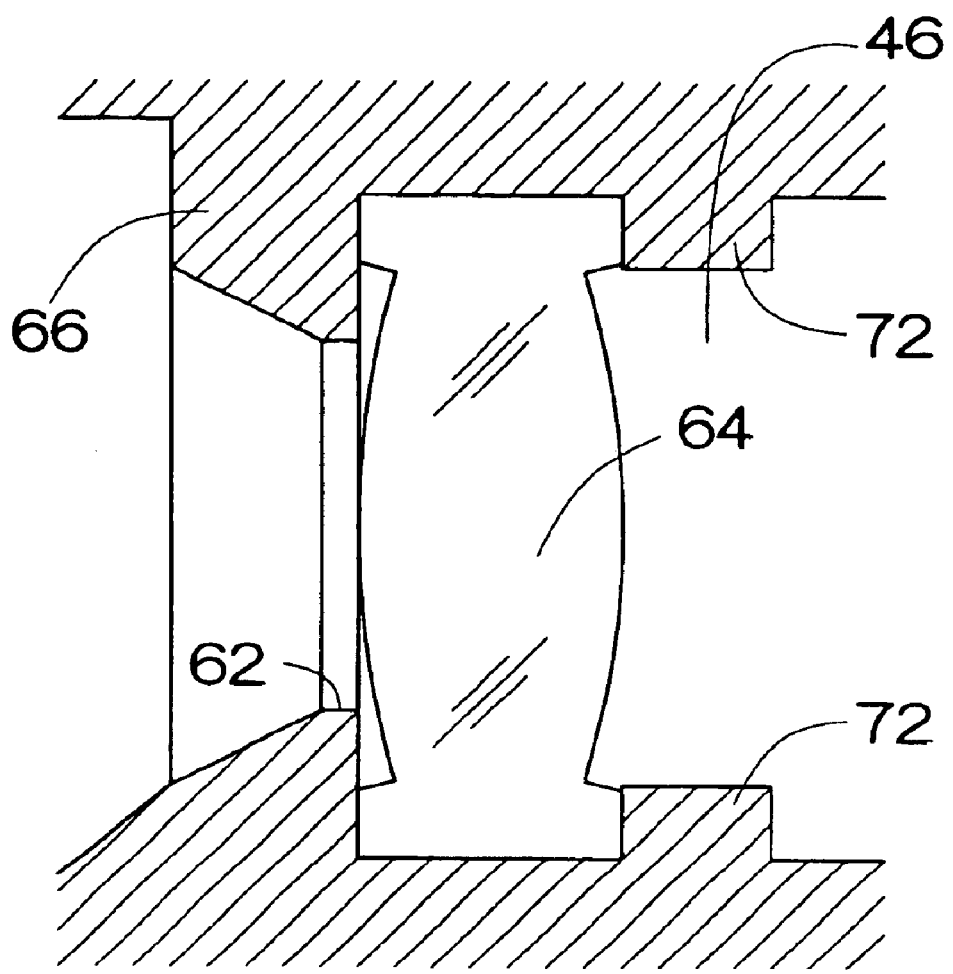
FIG. 6 shows a sectional view along line 6—6 in FIG. 5.

The fitting hole 70 for the image-forming lens 64 is formed in substantially the same size as the external size of the image-forming lens 64, and penetrates the inner wall surface of the take-up spool chamber 40 into the space 46. The image-forming lens 64 inserted into the space 46 through the fitting hole 70 is pressed in between projections 72 and 72, formed protruding from the top and bottom faces of the space 46, and the partitioning wall 66 as shown in FIG. 6, and held immediately behind the aperture 62.

Installation of the image-forming lens 64 by pressing it in through the fitting hole 70 bored in the inner wall surface of the take-up spool chamber 40 into the space 46 makes it possible to hold the image-forming lens 64 accurately even if the wall of the take-up spool chamber 40 is thin. Furthermore, the reduction in the wall thickness of the take-up spool chamber 40 enables the take-up spool chamber 40 to be arranged closer to the center of the camera 10 and thereby makes it possible for the camera 10 to be built more compactly.

Although the data superimposing device is installed in the space 46 formed between the take-up spool chamber 40 and the photographic light path shielding cylinder 36 in the foregoing embodiments, a similar space may as well be formed between the cartridge chamber 38 and the photographic light path shielding cylinder 36, and the data superimposing device can be installed in this space. In this case, too, the aperture would be arranged in the narrowest position of the space by utilizing the arc-shaped wall surface of the cartridge chamber 38.

As hitherto described, according to the present invention, by providing the aperture in the narrowest position of the space formed between the outer wall surface of the photographic light path shielding cylinder and the arc-shaped outer wall surface of the cartridge chamber or the take-up spool chamber, the space, though limited in size, is expanded before and behind the aperture to make possible effective flare suppression and clear superimposition of data. Furthermore, as the structure is simple, the manufacturing is facilitated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A data superimposing device in a camera for superimposing an image representing data on a film, comprising:

a light emitting unit which has a plurality of light emitting points emitting a luminous flux in synchronism with a running of the film to superimpose the image on the film, the light emitting unit being arranged in a space formed between an outer wall surface of a photographic light path shielding cylinder and an arc-shaped outer wall surface of one of a film cartridge chamber and a film take-up spool chamber;

an image-forming lens which is arranged in the space and causes the luminous flux to form the image on the film; and an aperture member which has an aperture through which the luminous flux travels to reach the film, the aperture being arranged at a narrowest position of the space.

2. The data superimposing device as defined in claim 1, wherein the image-forming lens is arranged immediately behind the aperture.

3. The data superimposing device as defined in claim 2, wherein the image-forming lens is installed by being pressed in through a fitting hole bored in an inner wall of the one of the film cartridge chamber and the film take-up spool chamber from a side of the one of the film cartridge chamber and the film take-up spool chamber.

* * * * *